United States Patent
Vigeland et al.

(10) Patent No.: US 6,503,296 B1
(45) Date of Patent: Jan. 7, 2003

(54) MEMBRANE AND USE THEREOF

(75) Inventors: Bent Vigeland, Porsgrunn (NO); Rita Glenne, Porsgrunn (NO); Turid Breivik, Porsgrunn (NO); Stein Julsrud, Skien (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/700,736

(22) PCT Filed: Jun. 5, 1998

(86) PCT No.: PCT/NO98/00172

§ 371 (c)(1), (2), (4) Date: Jan. 8, 2001

(87) PCT Pub. No.: WO99/59702

PCT Pub. Date: Nov. 25, 1999

(30) Foreign Application Priority Data

May 20, 1998 (NO) ................................. 982321

(51) Int. Cl.$^7$ ................................. B01D 53/22
(52) U.S. Cl. ................................. 95/54; 96/4
(58) Field of Search ................. 95/45, 54; 96/4, 96/10, 11

(56) References Cited

U.S. PATENT DOCUMENTS

| | | | | |
|---|---|---|---|---|
| 5,055,512 A | | 10/1991 | Kauffman et al. | |
| 5,108,465 A | * | 4/1992 | Bauer et al. | 95/54 |
| 5,160,713 A | * | 11/1992 | Mazanec et al. | 95/54 X |
| 5,240,473 A | * | 8/1993 | Carolan et al. | 95/54 |
| 5,240,480 A | * | 8/1993 | Thorogood et al. | 95/54 X |
| 5,261,932 A | * | 11/1993 | Carolan et al. | 95/54 |
| 5,269,822 A | * | 12/1993 | Carolan et al. | 95/54 |
| 5,447,555 A | * | 9/1995 | Yee et al. | 95/54 |
| 5,516,359 A | * | 5/1996 | Kang et al. | 95/14 |
| 5,648,304 A | * | 7/1997 | Mazanec et al. | 95/4 X |
| 5,712,220 A | * | 1/1998 | Carolan et al. | 95/54 X |
| 5,714,091 A | * | 2/1998 | Mazanec et al. | 252/373 |
| 5,788,748 A | * | 8/1998 | Mazanec et al. | 95/54 X |
| 5,935,298 A | * | 8/1999 | Prasad et al. | 95/54 X |
| 5,938,822 A | * | 8/1999 | Chen et al. | 95/54 X |
| 5,954,859 A | * | 9/1999 | Keskar et al. | 95/54 |
| 5,964,922 A | * | 10/1999 | Keskar et al. | 95/54 X |
| 5,976,223 A | * | 11/1999 | Prasad et al. | 95/54 |
| 6,010,614 A | * | 1/2000 | Keskar et al. | 95/54 X |
| 6,033,632 A | * | 3/2000 | Schwartz et al. | 422/190 |
| 6,056,807 A | * | 5/2000 | Carolan et al. | 96/4 |
| 6,090,500 A | * | 7/2000 | Ishihara et al. | 96/4 X |
| 6,139,604 A | * | 10/2000 | Gottzmann et al. | 95/54 |
| 6,149,714 A | * | 11/2000 | Kobayashi | 95/54 |
| 6,165,431 A | * | 12/2000 | Mackay et al. | 95/54 X |
| 6,187,157 B1 | * | 2/2001 | Chen et al. | 95/45 X |
| 6,235,187 B1 | * | 5/2001 | Anderson et al. | 95/54 X |
| 6,264,811 B1 | * | 7/2001 | Wang et al. | 95/54 X |

FOREIGN PATENT DOCUMENTS

| | | |
|---|---|---|
| JP | 1215702 | 8/1989 |
| JP | 2221125 | 9/1990 |
| JP | 3150209 | 6/1991 |
| JP | 7133189 | 5/1995 |
| WO | WO 97/28884 | 8/1997 |
| WO | WO 97/41060 | 11/1997 |

* cited by examiner

Primary Examiner—Robert H. Spitzer
(74) Attorney, Agent, or Firm—Wenderoth, Lind & Ponack, L.L.P.

(57) ABSTRACT

The present invention relates to a dense single-phase membrane having both high ionic and electronic conductivity and capable of separating oxygen from an oxygen containing gaseous mixture, where the membrane comprises a mixed metal oxide material with interstitial oxygen excess represented by the formula $A_y A'_{y'} A''_{y''} B_x B'_{x'} B''_{x''} B'''_{x'''} O_{4+\delta}$, where A, A' and A" are chosen from group 1, 2 and 3 and the lanthanides; and B, B', B" and B''' are chosen from the transition metals according to the periodic table of the elements adopted by IUPAC wherein $0 \leq y \leq 2$, $0 \leq y' \leq 2$, $0 \leq y'' \leq 2$, $0 \leq x \leq 1$, $0 \leq x' \leq 1$, $0 \leq x'' \leq 1$, $0 \leq x''' \leq 1$, and x and y each represents a number such that $y+y'+y''=2$, $x+x'+x''+x'''=1$, and δ is a number where $0 \leq \delta < 1$ quantifying the oxygen excess. Furthermore, the invention relates to a use of the membrane for production of pure oxygen, oxygen enrichment of a sweep gas for fossil energy conversion, for synthesis gas production and for production of oxygen for application in any catalytic or non-catalytic processes wherein oxygen is one of the reactants.

8 Claims, 2 Drawing Sheets

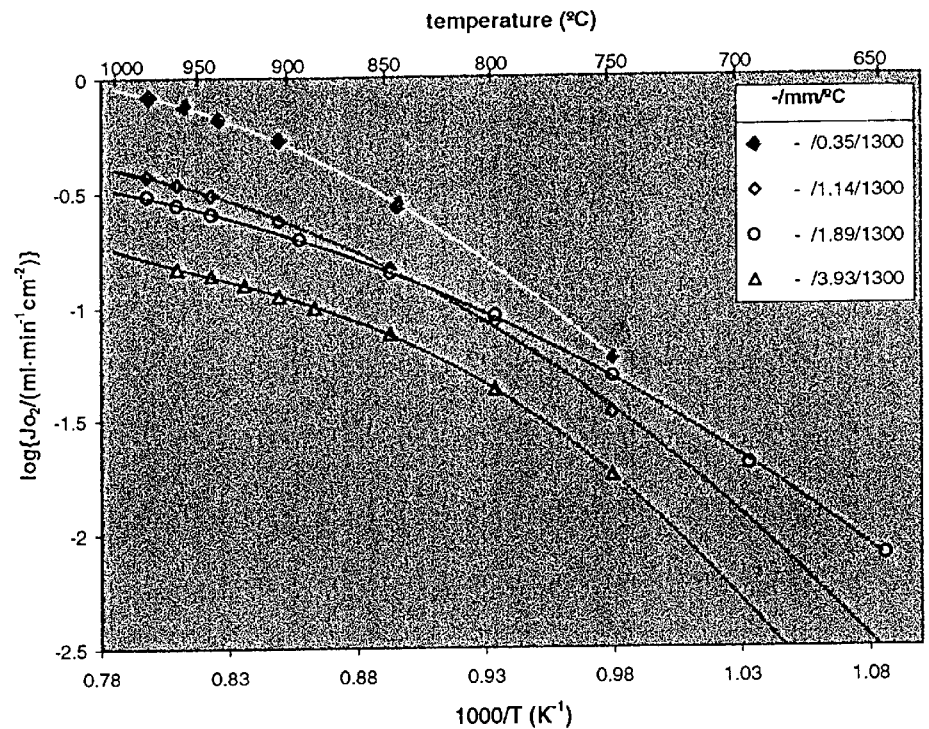
Figure 1.  Oxygen flux versus inverse temperature of $La_2NiO_{4+\delta}$ membranes with varied thickness (mm).
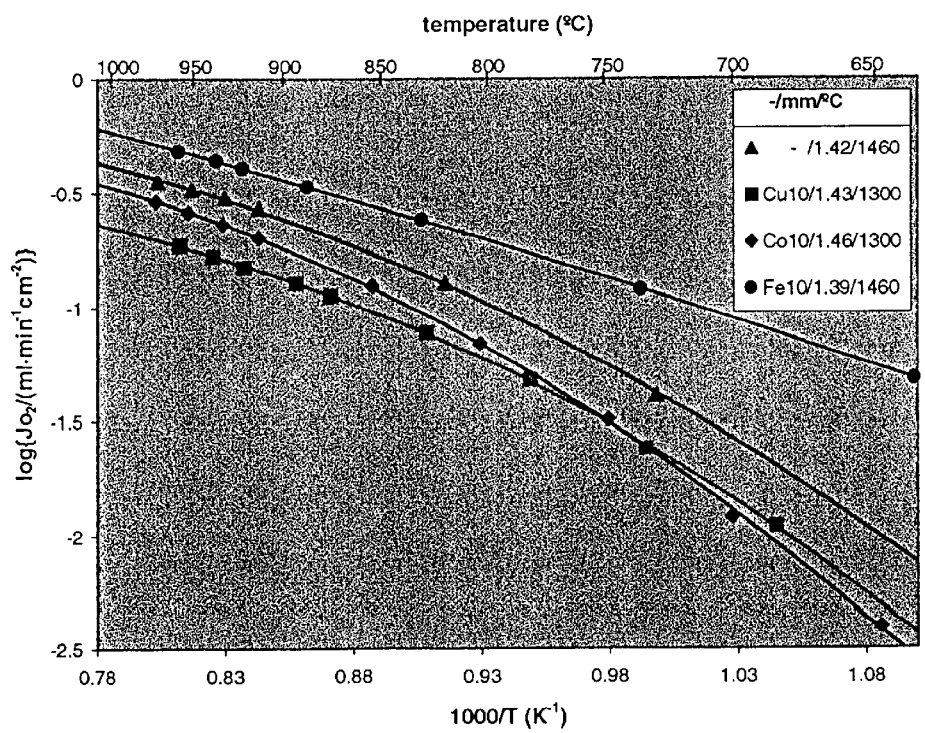
Figure 2.  Oxygen flux versus inverse temperature of $La_2Ni_{1-x}B_xO_{4+\partial}$ where x= 0 and 0.1 and B is copper, cobalt or iron respectively.

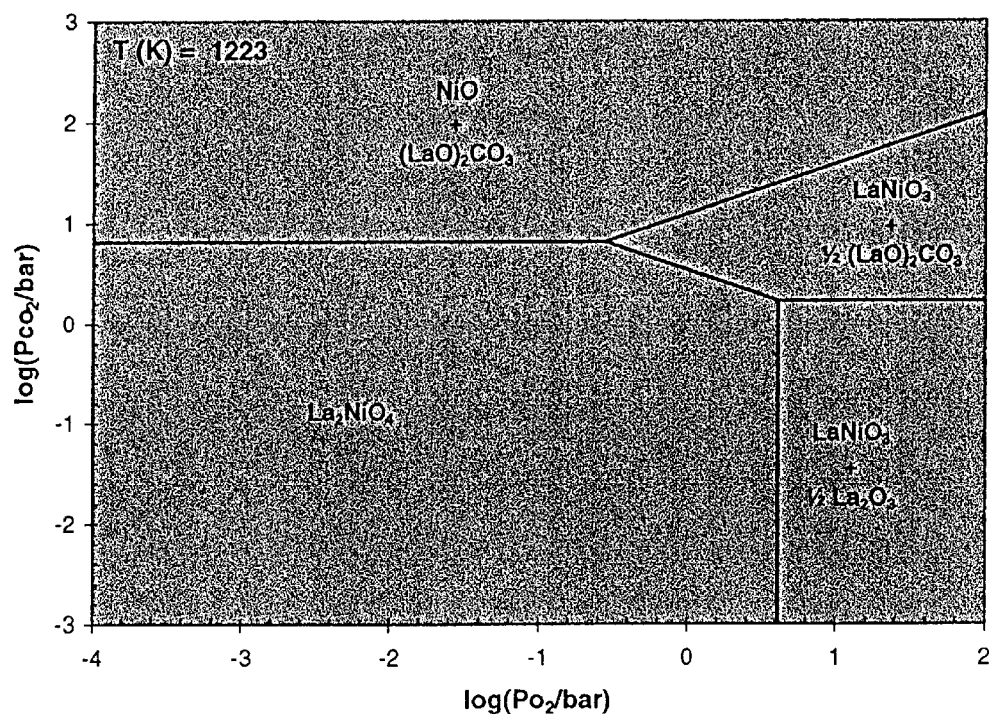
Figure 3. Tentative stability diagram at constant temperature (950°C) for the nominal cation composition corresponding to $La_2NiO_{4+\delta}$ in the presence of $CO_2$ and $O_2$.

MEMBRANE AND USE THEREOF

This invention relates to a dense single phase membrane having both high ionic and electronic conductivity and capable of separating oxygen from an oxygen containing gaseous mixture and further use of the membrane.

Inorganic membranes are beginning to show promise for use in commercial processes for separating oxygen from an oxygen containing gaseous mixture. Envisioned applications range from small scale oxygen pumps for medical use to large scale integrated gasification combined cycle plants. This technology encompasses two different kinds of membrane materials, solid electrolytes that are mixed conductors and ionic conductors. In both cases the transport is by anionic vacancies or interstitial defects in the electrolyte. In the case of pure ionic conductors, electrons have to be transported in an external circuit, while in the case of mixed conductors no external circuit is necessary as electrons are transported in the membrane material. The driving force for transport is in the mixed conductor case supplied by a difference in partial pressure of oxygen between the two sides of the membrane, while in the pure ionic case in addition an external electrical potential can be supplied.

Membranes formed from mixed conducting oxides which are operated at elevated temperatures can be used to selectively separate oxygen from an oxygen containing gaseous mixture when a difference in oxygen partial pressure exists across the membrane. Oxygen transport occurs as molecular oxygen is dissociated into oxygen ions which migrate to the low pressure side of the membrane and recombine to form oxygen molecules. Electrons migrate through the membrane in the opposite direction to conserve charge. The rate at which oxygen permeates through the membrane is mainly controlled by two factors, the diffusion rate within the membrane and the rate of interfacial oxygen exchange. Diffusion controlled oxygen permeability is known to increase proportionally with decreasing membrane thickness at high temperature (Fick's law). With decreasing thickness the surface exchange control becomes more important.

During recent years the use of dense mixed conducting membranes in various processes has been described. Examples are oxygen production described in European Patent Application no 95100243.5 (EP-A-663230), U.S. Pat. No. 5,240,480, U.S. Pat. No. 5,447,555, U.S. Pat. No. 5,516,359 and U.S. Pat. No. 5,108,465, partial oxidation of hydrocarbons described in U.S. Pat. No. 5,714,091 and European Patent Application no 90134083.8 (EP-A-438902), production of synthesis gas described in U.S. Pat. No. 5,356,728 and enrichment of a sweep gas for fossil energy conversion with economical CO2 abatement described in the none published international patent Application Nos.: PCT/NO97/00170, PCT/NO97/00171 and PCT/NO97/00172 (Norsk Hydro ASA).

For the application of MCM (Mixed Conducting Membrane) technology, the membrane material must fulfill certain requirements in addition to being a good mixed conductor. These fall into the two categories of thermodynamic and mechanical stability. The membrane material must be thermodynamically stable over the appropriate temperature and oxygen partial pressure range. Furthermore, the membrane material must be stable towards the additional components in the gaseous phase, and towards any solid phase in contact with it (e.g. support material). This calls for different materials for different applications.

Previous reports on oxygen permeable membranes have dealt with perovskite related materials based on the general formula $ABO_{3-\delta}$ where A and B represent metal ions. $\delta$ has a value between 0 and 1 indicating the concentration of oxygen vacancies. In the idealised form of the perovskite structure it is required that the sum of the valences of A ions and B ions equals 6. Materials known as "perovskites" are a class of materials which has an X-ray identifiable crystalline structure based upon the structure of the mineral perovskite, $CaTiO_3$. Perovskite type oxides $ABO_{3-\delta}$ containing dopants on the A and B-site are promising materials for oxygen-permeable membranes. In such materials the oxygen ions are transported through the membrane via oxygen vacancies. Usually the large A-site cation is a trivalent rare earth, while the smaller B-cation is a transition metal (e.g. $LaCoO_{3-\delta}$). The trivalent rare earth A-site cation is usually partially substituted by divalent alkaline earth (e.g. Sr), to increase the vacancy concentration, $\delta/3$, on the oxygen sub lattice. A similar increase in $\delta$ can be accomplished by partial substitution of the B-site cation by a divalent cation (e.g. Zn, Mg), or more commonly by another mixed-valent transition metal (e.g. Fe, Ni, Cu). One of the first reported examples of such a material is $La_{0.8}Sr_{0.2}Co_{0.8}Fe_{0.2}O_{3-\delta}$ (Teraoka et al., Chem. Lett. (1985) 1743–1746). European patent application no. 95100306.0 (EP-A-663232) and U.S. Pat. No. 5,712,220 describe compositions of this type for oxygen separation.

When A is divalent and B is trivalent $\delta$ will be close to 0.5. A number of these compounds adopt the brown millerite structure where the oxygen vacancies are ordered in layers. Compositions of this type are described in U.S. Pat. No. 5,714,091 and International patent application no.: PCT-US96/14841 for use as membranes in the partial oxidation reactors.

When separating oxygen from an oxygen containing gaseous mixture the membrane is a conductor of product fluid ions and electrons. When no direct oxidation process takes place on the product site of the membrane there is a relatively small difference in partial pressure of oxygen across the membrane, and accordingly the driving force is small. For such applications it is beneficial to use a membrane material where the defects are interstitial oxygen excess, with most of the stoichiometry change in the oxygen partial pressure range in question, rather than oxygen vacancies as in the perovskites. This will ensure a maximum of gradient in oxygen concentration in the material at small oxygen partial pressure gradients. The activation energy for transport of oxygen ions will most often be lower in the case of interstitials than in the case of vacancies.

The main object of the invention was to arrive at a membrane capable of separating oxygen from an oxygen containing gaseous mixture.

Another object of the invention was to arrive at a membrane comprising a material thermodynamically stable over the appropriate temperature and oxygen partial pressure range.

Furthermore, an object of the invention was to arrive at a membrane comprising a material possessing structures that can accommodate interstitial oxygen excess.

Furthermore, another object of the invention was to arrive at a membrane comprising a material showing very low chemical expansion.

Still another object of the invention was to arrive at a membrane stable towards the additional components in the gaseous phase.

Still another object of the invention was to arrive at a membrane stable towards any solid phase in contact with the membrane.

The inventors found that a dense single-phase membrane comprising of a mixed metal oxide material with interstitial oxygen excess represented by the formula:

$$A_y A'_{y'} A''_{y''} B_x B'_{x'} B''_{x''} B'''_{x'''} O_{4+\delta}$$

where A, A' and A" are chosen from group 1, 2 and 3 and the lanthanides; and B, B', B" and B''' are chosen from the transition metals according to the periodic table of the elements adopted by IUPAC wherein $0 \leq y \leq 2$, $0 \leq y' \leq 2$, $0 \leq y'' \leq 2$, $0 \leq x \leq 1$, $0 \leq x' \leq 1$, $0 \leq x'' \leq 1$, $0 \leq x''' \leq 1$ and x and y each represents a number such that $y+y'+y''=2$, $x+x'+x''+x'''=1$ and $\delta$ is a number where $0 \leq \delta < 1$ quantifying the oxygen excess has both high ionic and electronic conductivity and is capable of separating oxygen from an oxygen containing gaseous mixture.

Furthermore, the inventors found that this membrane was suitable for use for production of pure oxygen, for oxygen enrichment of a sweep gas for fossil energy conversion, for synthesis gas production and for production of oxygen for application in any catalytic or non-catalytic processes wherein oxygen is one of the reactants.

The membrane is especially suitable in applications with high $CO_2$ and high $H_2O$ partial pressures. Thus the membrane is suitable for $O_2$-enrichment of a sweep gas containing $CO_2$ for fossil energy conversion with economical $CO_2$ abatement.

Preferably the A, A' and A" of the enumerated formula are selected from group 2, 3 or the lanthanide metals. The structure of the complex oxide is such that the d-block metals are nominally six-coordinated by oxygen, forming sheets of oxygen octahedra stacked one above the other. Adjacent sheets are displaced relative to one another by ½ ½ ½. The lanthanide metals are positioned in between these sheets. In the lanthanide layer interstitial positions are available for excess oxygen.

The structure is usually referred to as the "$KNiF_4$-structure" after the compound $KNiF_4$ (C.N.Rao and I. Gopalakrishnan "New Directions in the Solid State Chemistry" Cambridge University Press 1997).

Preferred mixed conducting dense oxides are represented by the formula $La_2Ni_{1-x}B_xO_{4+\delta}$ wherein x is between 0 and 1 and B is selected from nickel, iron, cobalt and copper. The purpose of the substitution for Ni is mainly to optimize the material for the partial pressures of oxygen in question.

In practice, an oxygen containing gas, such as air, is passed in contact with the solid membrane on one side, the first zone. As the oxygen containing gas contacts the solid membrane, oxygen is reduced to oxygen ions which are transported through the solid electrolyte to the surface on the other side facing the second zone with lower partial pressure of oxygen. At the second zone the oxygen ions are either oxidised to oxygen gas (pure oxygen production) or oxidised and consumed with an enrichment of a sweep gas of $H_2O$ and/or $CO_2$ (fossil energy conversion with $CO_2$ abatement). The released electrons at the surface facing the second zone are transported back to the surface facing the first zone via the solid membrane. The total conductivities (ionic and electronic) of the membranes lie in the range 60 to 100 S/cm and the membranes are therefore well suited for such processes. The driving force for the process is the difference in oxygen partial pressure across the membrane which establish an oxygen ion concentration gradient through the membrane.

The oxygen flux through membranes are controlled either by surface kinetic limitations (on one or both sides) or bulk diffusion limitations.

The oxygen flux rates of e.g. the $La_2Ni_{1-x}B_xO_{4+\delta}$ membranes (0.3–4 mm thickness) display a considerable degree of surface exchange control, increasing with decreasing temperature. FIG. 1 shows typical flux rates for pure $La_2NiO_{4+\delta}$. At the highest temperatures the slopes appear to be similar, but as the temperature is decreased, the slopes experience quite different behaviours which might be an indication that the surface exchange becomes increasingly more important in the oxygen transport process as the temperature decreases. Apparent total activation energies for oxygen flux in the temperature range 900–1000° C. were 55–80 kJ/mol which is about 75–150 kJ/mol lower than for known perovskite related materials based on the general formula $ABO_3$ (Carter et al. Solid State Ionics 53–56 (1992) p.597–605). Activation energies for bulk transport and surface exchange were estimated as (40±15) and (100±10) kJ/mol, respectively. The flux rates are weakly dependent on substitution as demonstrated in FIG. 2. The highest rates were found when B was selected from iron and x=0.1, corresponding to $1.0 \text{ ml} \cdot cm^{-2} min^{-1}$ at 975° C. for a 0.5 mm thick membrane in an oxygen partial pressure gradient of $\Delta \log(P_{O2}/bar)=2.3$ ($P_{O2}=0.5$ bar at the feed side). The surface exchange control can be reduced with a catalytic layer on one or both sides, or the surface area can be made larger with a porous layer of the same material. In the latter case the porous layer can also act as a mechanical support to the dense thin membrane (e.g. as described in U.S. Pat. No. 5,240,480).

Another attractive feature of these membrane materials is the low so-called "chemical expansion". When the stoichiometry of a material varies with the oxygen pressure, a volume change with change in oxygen partial pressure is observed.

This effect, referred to as "chemical expansion", causes strain when the material is subjected to an oxygen partial pressure gradient, and thus limits how thin a membrane can be without mechanically cracking. The membrane materials of the present invention show very low chemical expansions, thus minimising this problem.

For the application of separating or recovering oxygen from a gas mixture containing oxygen at elevated temperatures, the membrane material must be thermodynamically stable over the appropriate temperature and oxygen partial pressure range. Furthermore, the membrane material must be stable towards the additional components in the gaseous phase. The membrane materials of the present invention possessing the "$K_2NiF_4$-structure", are suitable as membranes in applications with high $CO_2$ pressures. At 950° C. and oxygen partial pressures below 1 bar, the materials are estimated to be stable at $CO_2$ pressures up to 2–6 bar.

FIG. 3 shows a tentative stability diagram at constant temperature (950° C.) for $La_2NiO_{4+\delta}$ in the presence of $CO_2$ and $O_2$. The stability of the $La_2Ni_{1-x}B_xO_{4+\delta}$ materials towards reaction with $CO_2$ increases with increasing temperature. Hence, at e.g. 1000° C. (and 1100° C.), these materials can be used at $CO_2$ pressures up to approximately 10 and 30 bar respectively. The materials will be stable towards superheated steam with steam pressures in excess of 100 bar above 1000° C. This relatively high stability towards $H_2O$ and $CO_2$ renders these materials suitable as membranes for $O_2$-enrichment of steam or $CO_2$ containing sweep gases.

The membrane material must be stable towards any solid phase in contact with it such as supporting and sealing materials, at the operating temperature. The thermal expansion coefficient (TEC) of the membrane of the present invention is approximately $14*10^{-6} K^{-1}$ and match well with different suitable sealing materials according to the none published international patent application no.: PCT/NO97/00169 (Norsk Hydro ASA).

The membrane of the present invention can be used to separate oxygen from an oxygen containing gas or gas mixture. When an oxygen-containing gas with a moderately high oxygen partial pressure is passed along one side of the membrane, oxygen will adsorb and dissociate on the membrane surface, become ionised and diffuse through the solid membrane as interstitial oxygen excess, and desorb as oxygen gas at the low oxygen partial pressure side of the membrane.

The necessary circuit of electrons for this ionization/deionization process is maintained internally in the oxide via its electronic conductivity. Typically mixed conducting oxides demonstrate an oxygen ionic conductivity ranging from 0.01 S/cm to 10 S/cm and an electronic conductivity ranging from about 1 S/cm to 1000 S/cm under operating conditions. A membrane of the present invention, represented by unsubstituted $La_2Ni_{1-x}B_xO_{4+\delta}$, has a typical total (electronic and ionic) conductivity at operating conditions ranging from about 60 S/cm to 100 S/cm in the temperature range 600–1000° C.

The invention will be further explained and envisaged in the figures and the examples.

FIG. 1 shows oxygen flux versus inverse temperature of $La_2NiO_{4+\delta}$ membranes with varied thickness (mm).

FIG. 2 shows oxygen flux versus inverse temperature of $La_2Ni_{1-x}B_xO_{4+\delta}$ where x=0 and 0.1 and B is copper, cobalt or iron respectively.

FIG. 3 shows tentative stability diagram at constant temperature (950° C.) for the nominal cation composition corresponding to $La_2NiO_{4+\delta}$ in the presence of $CO_2$ and $O_2$.

EXAMPLE 1

This example describes the activation energy for oxygen flux of unsubstituted $La_2NiO_{4+\delta}$.

The powder of the membrane material according to the claimed invention is synthesised by soft chemistry routes and sintered to >95% of theoretical density. The purity of the sintered disks are examined by XRD (X-ray diffraction). Two different types of experimental apparatuses have been constructed to perform measurements of oxygen permeability. In the first type, the membrane is maintained at ambient pressure in the absence of a total pressure gradient. In the second type, the membrane is kept in a total pressure gradient of up to 20 bar.

The oxygen fluxes, in units of $ml \cdot min^{-1}cm^{-2}$, are illustrated in FIG. 1 for membranes with varying thickness. At the highest temperatures the slopes appear to be similar, but when the temperature is decreased, the slopes experience quite different behaviours. This may be an indication that the surface exchange becomes increasingly more important in the oxygen transport process as the temperature decreases. Another possible explanation of the poor reproducibility of the measured flux, is the possible thermodynamic instability of the $La_2NiO_{4+\delta}$ at lower temperatures. As the temperature decreases, $\delta$ will increase as a larger fraction of the Ni will be converted from divalent to trivalent. At some limiting $\delta$, $La_2NiO_{4+\delta}$ will decompose to compounds containing more trivalent Ni ($La_3Ni_4O_{10}$ or $LaNiO_{3-\delta}$).

The possible increased importance of surface control as the temperature decreases can be investigated in some more detail. At constant temperature the flux rate ($J_{O2}$) should be dependent on membrane thickness (d) according to the expression:

$$1/J_{O2}=(d_s+d)/j_b$$

The parameter $d_s$ is proportional to the degree of surface control and can be thought of as an apparent additional bulk thickness due to the resistance of the surfaces involved in the transport process. The second parameter, $j_b$, is the flux rate for a bulk controlled membrane with unity thickness. By fitting the measured flux data to this equation the parameters $d_s$ and $j_b$ are obtained:

$$1/J_{O2}=(d_s+d)/j_b$$

| Temperature (° C.) | $d_s$(mm) | $j_b$($ml min^{-1}cm^{-2}$) |
|---|---|---|
| 900 | 0.83 | 0.532 |
| 925 | 0.74 | 0.597 |
| 950 | 0.66 | 0.652 |
| 975 | 0.58 | 0.696 |
| 1,000 | 0.51 | 0.729 |

In the temperature range 900–1000° C. apparent activation energies for oxygen flux vary within the range 55–80 kJ/mol. The parameters $d_s$ and $j_b$ give activation energies of (40 ±15) kJ/mol and (100±10) kJ/mol for bulk transport and surface exchange, respectively. These activation energies are low compared to similar data reported by e.g. Carter et al. Solid State Ionics 53–56 (1992). From their work the following activation energies (kJ/mol) in the temperature range 800–900° C. can be deduced.

| | Surface exchange | Bulk transport |
|---|---|---|
| $La_{0.8}Sr_{0.2}CoO_{3-\delta}$ | 150 kJ/mol | 70 kJ/mol |
| $La_{0.6}Sr_{0.4}Co_{0.8}Fe_{0.2}O_{3-\delta}$ | 70 kJ/mol | 120 kJ/mol |

EXAMPLE 2

This example describes oxygen flux with unsubstituted and B-site substituted $La_2NiO_{4+\delta}$.

The oxygen fluxes, in units of $ml \cdot cm^{-2}min^{-1}$, of unsubstituted and of B-site substituted $La_2Ni_{1-x}B_xO_{4+\delta}$, produced in the same manner as described in Example 1, are given as a function of temperature in FIG. 2 where x=0 and 0.1, and B is Cu, Co or Fe. The flux rates are only weakly dependent on substitution type and level.

Focusing on the high temperature region (900–1000° C.), it is evident that the substitutions do not influence the oxygen flux strongly. Copper substitution appears to have a slight negative effect on the flux, as is expected since the effect of copper is to lower the concentration of excess oxygen. Cobalt substitution, having the effect of increasing the excess oxygen concentration, is expected to increase the flux. However, no clear increase can be seen for a substitution level of x=0.1. Similar to cobalt substitution, iron is expected to have a positive effect on the flux, this effect being stronger with iron. FIG. 1 indicates a slight such effect.

In the temperature range 900–1000° C. the apparent activation energies for oxygen flux vary within the range 55–80 kJ/mol for both unsubstituted and substituted material.

EXAMPLE 3

This example describes thermal and chemical expansion.

The claimed membrane, prepared in the same manner as described in example 1, was examined in a dilatometer. The thermal expansion coefficient (TEC) for unsubstituted and B-site substituted $La_2Ni_{1-x}B_xO_{4+\delta}$ were measured to be approximately $14*10^{-6}K^{-1}$ in the temperature range 20–1000° C., which is low compared to other oxygen separating membrane materials.

At elevated temperature the change in length of the samples were measured as a function of the partial pressure of oxygen. At 920° C. a change in the oxygen partial pressure from $10^{-5}$ to 1 bar correspond to a linear chemical expansion of 0.004%. Compared to other oxygen separating membrane materials the chemical expansion is low.

The given examples demonstrate that the membranes according to the present invention are excellent oxygen membranes with oxygen flux rates of the order 1 ml·min$^-$1cm$^{-2}$ for 0.5 mm thick membranes at 900–1000° C. with a driving force corresponding to $\Delta\log(P_{O2}/bar)=2.3$. The membranes have low apparent activation energies for oxygen flux in the range 55–80 kJ/mol. The flux rates and activation energies are relativley independent of substitution for membranes represented by the formula $La_2Ni_{1-x}B_xO_{4+\delta}$, when x=0.1 and B is Ni, Cu, Co, or Fe. The flux under the afore-mentioned conditions is largely controlled by surface exchange kinetics. The surface exchange control can, on the other hand, be reduced with a catalytic layer on one or both sides, or by increasing the surface area with a porous layer. The thermal expansion coefficient is low at approximately $14*10^{-6}$ $K^{-1}$. The linear chemical expansion of these oxygen membrane materials is very low at 0.004% for $\Delta\log(P_{O2}/bar)=5$.

Furthermore, the membranes of the present invention, have some important advantages relative to previously reported oxygen membrane materials as high stability at high pressures of $CO_2$ and $H_2O$ combined with high flux rates, low activation energies for oxygen flux, low chemical expansion and low thermal expansion.

What is claimed is:

1. A dense single-phase membrane having both high ionic and electronic conductivity and capable of separating oxygen from an oxygen-containing gaseous mixture, wherein the membrane comprises a mixed metal oxide material with interstitial oxygen excess represented by the formula:

$$A_yA'_{y'}A''_{y''}B_xB'_{x'}B''_{x''}B'''_{x'''}O_{4+\delta}$$

where A, A' and A" are selected from group 1, 2 and 3 and the lanthanides; and B, B', B" and B'" are selected from the transition metals according to the periodic table of the elements adopted by IUPAC wherein $0\leq y\leq 2$, $0\leq y'\leq 2$, $0\leq y''\leq 2$, $0\leq x\leq 1$, $0\leq x'\leq 1$, $0\leq x''\leq 1$, $0\leq x'''\leq 1$ and x and y each represents a number such that y+y'+y"=2, x+x'+x"+x'"=1 and $\delta$ is a number where $0\leq\delta<1$ quantifying the oxygen excess.

2. A dense single-phase membrane according to claim 1, wherein the membrane comprises a material having a $K_2NiF_4$ structure.

3. A dense single-phase membrane according to claim 1, wherein A, A' and A" are selected from group 2, 3 and the lanthanide metals.

4. A dense single-phase membrane according to claim 1, wherein the membrane comprises a mixed metal oxide material having a $K_2NiF_4$ structure represented by the formula:

$$La_2Ni_{1-x}B_xO_{4+\delta}$$

wherein x is between 0 and 1 and B is selected from nickel, iron, cobalt and copper.

5. A method for production of pure oxygen, which comprises bringing an oxygen-containing gas in contact with the membrane of claim 1, passing oxygen ions through the membrane, and oxidizing the oxygen ions to produce oxygen gas.

6. A method for oxygen enrichment of a sweep gas for fossil energy conversion, which comprises bringing an oxygen-containing gas in contact with the membrane of claim 1, passing oxygen ions through the membrane, oxidizing the oxygen ions to produce oxygen gas, and enriching the sweep gas with the oxygen gas.

7. A method for oxygen enrichment of a sweep gas for application in synthesis gas production, which comprises bringing an oxygen-containing gas in contact with the membrane of claim 1, passing oxygen ions through the membrane, oxidizing the oxygen ions to produce oxygen gas, and enriching the sweep gas with the oxygen gas.

8. A method for production of oxygen for application in a catalytic or non-catalytic process wherein oxygen is a reactant, which comprises bringing an oxygen-containing gas in contact with the membrane of claim 1, passing oxygen ions through the membrane, oxidizing the oxygen ions to produce oxygen gas, and introducing the oxygen gas into the catalytic or non-catalytic process.

* * * * *